United States Patent
Imagawa et al.

(10) Patent No.: US 7,180,050 B2
(45) Date of Patent: Feb. 20, 2007

(54) OBJECT DETECTION DEVICE, OBJECT DETECTION SERVER, AND OBJECT DETECTION METHOD

(75) Inventors: Taro Imagawa, Osaka (JP); Masamichi Nakagawa, Osaka (JP); Takeo Azuma, Nara (JP); Shusaku Okamoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/486,677

(22) PCT Filed: Apr. 25, 2003

(86) PCT No.: PCT/JP03/05407

§ 371 (c)(1),
(2), (4) Date: Feb. 12, 2004

(87) PCT Pub. No.: WO03/092291

PCT Pub. Date: Nov. 6, 2003

(65) Prior Publication Data

US 2004/0211883 A1 Oct. 28, 2004

(30) Foreign Application Priority Data

Apr. 25, 2002 (JP) ............................. 2002-123977

(51) Int. Cl.
*G05B 19/00* (2006.01)
*G06K 19/00* (2006.01)
(52) U.S. Cl. .................... 250/221; 340/5.81; 340/5.82; 340/5.61
(58) Field of Classification Search ................ 250/221; 315/154; 340/853.7, 5.81, 5.82, 5.61, 438, 340/572.1
See application file for complete search history.

(56) References Cited

U.S. PATENT DOCUMENTS

2006/0082439 A1* 4/2006 Bazakos .................... 340/5.82

FOREIGN PATENT DOCUMENTS

| JP | 07154846 A | * | 6/1995 |
| JP | 07154846 A | | 6/1995 |
| JP | 09046694 A | | 2/1997 |
| JP | 09046694 A | * | 2/1997 |
| JP | 10083454 A | | 3/1998 |
| JP | 11-266450 | | 9/1999 |
| JP | 2001-056853 A | | 2/2001 |

(Continued)

OTHER PUBLICATIONS

International Search Report for PCT/JP03/05407 mailed Aug. 5, 2003, ISA/JPO.

*Primary Examiner*—Thanh X. Luu
*Assistant Examiner*—Tony Ko
(74) *Attorney, Agent, or Firm*—Harness, Dickey & Pierce, P.L.C.

(57) ABSTRACT

A tag communication section (12) receives tag information transmitted from an information tag (11) attached to a person (P) to be detected. An attribute lookup section (15) looks up an attribute storage section (16) using ID included in the tag information to obtain attribute information such as the height of the person (P). A target detection section (14) specifies the position, posture and the like of the person (P) in an image obtained from an imaging section (13) using the attribute information.

13 Claims, 18 Drawing Sheets

FOREIGN PATENT DOCUMENTS

| | | |
|---|---|---|
| JP | 2001-118182 A | 4/2001 |
| JP | 2001167306 A | 6/2001 |
| JP | 2001202577 A | 7/2001 |
| JP | 2001307072 A | 11/2001 |
| JP | 2001307095 A | 11/2001 |
| JP | 2002-099907 A | 4/2002 |
| JP | 2002262163 A | 9/2002 |
| JP | 2003-061074 A | 2/2003 |

* cited by examiner

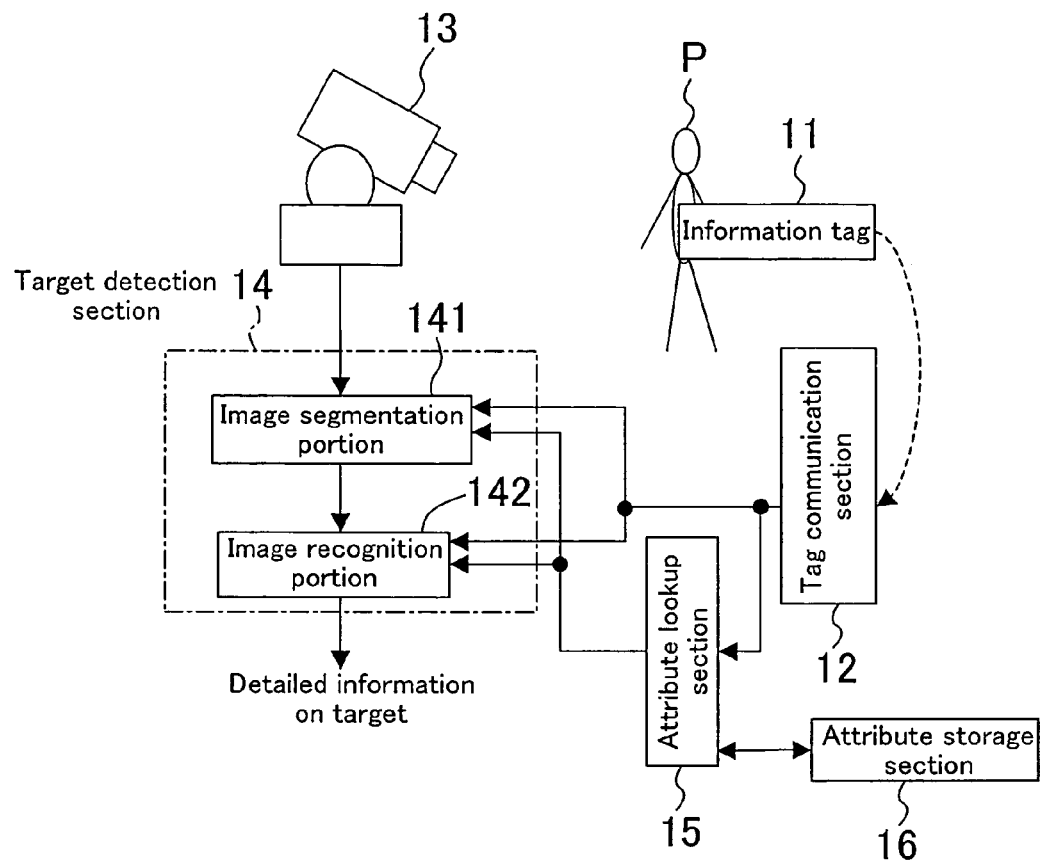
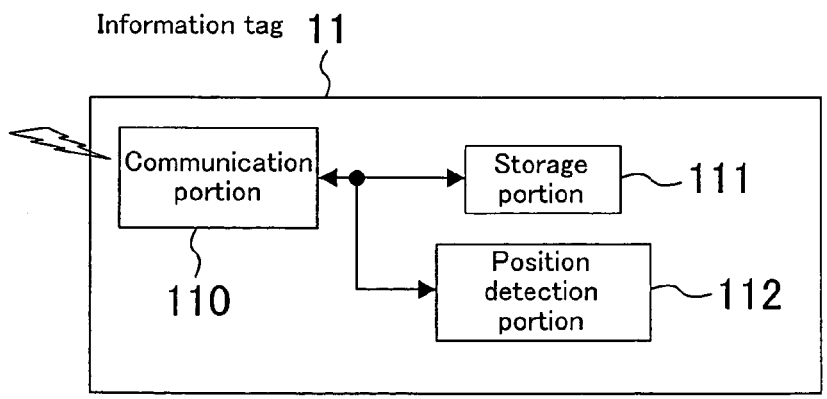

FIG.10
| | Height (cm) | Body type | Size of clothing |
|---|---|---|---|
| Child | 80～140 |  | S |
| Adult | 140～190 |  | L |
| Senior | 120～180 |  | M |

OBJECT DETECTION DEVICE, OBJECT DETECTION SERVER, AND OBJECT DETECTION METHOD

TECHNICAL FIELD

The present invention relates to a technology of detecting the accurate position, posture and the like of a given detection target, such as a person and an object, in an image.

BACKGROUND ART

Patent literature 1 below discloses a technology of controlling the orientation and zoom of a monitor camera in response to an approach of a transmitter. Specifically, a radio transmitter transmitting an ID code is attached to a person to be monitored. An antenna for detecting an approach of a transmitter is placed in an off-limits area. Once an approach of a transmitter is detected via the antenna, a monitor camera capable of capturing the surroundings of the antenna is automatically selected among a plurality of monitor cameras, and an image taken with the selected camera is displayed on a monitor. In addition, the ID code transmitted from the transmitter is read via the antenna, and based on the height of the person associated in advance with the ID code, the orientation and zoom of the monitor camera are determined.

(Patent Literature 1) Japanese Laid-Open Patent Publication No. 9-46694

Problems to be Solved

In recent years, with proliferation of the Internet, use of a monitoring system has started in which a monitor camera is connected to the Internet to enable transmission of images taken with the monitor camera. Such a system costs low and is easy in placement of a monitor camera, compared with a system using an exclusive line. In even such a system, however, an operator for monitoring images is still necessary. In the future, therefore, a technology permitting not only automatic capturing of a target to be monitored but also automatic retrieval of useful information from images is desired.

Also, with the recent advance of the robot technology, achievement of a home robot for assisting human lives is expected. Such a robot must have the function of detecting the situation surrounding itself and acting in harmony with the surrounding situation. For example, to properly move in a house and work for a person and an object, a robot must detect the position, posture and motion of a person and an object surrounding itself accurately. Otherwise, the robot will not be able to move and work accurately, much less to assist human lives.

With proliferation of portable cameras such as hand-held video cameras, digital cameras and camera-equipped mobile phones, it is increasingly desired that even an unskilled user could photograph a subject properly. For this, it is important to detect the position and the like of a target accurately.

However, the prior art described above finds difficulty in responding to the needs described above. Specifically, the above prior art merely selects a camera capturing a detection target in response to an approach of a transmitter. The prior art falls short of acquiring detailed information such as where the detection target is in a captured image and what posture the target takes. In addition, with use of an antenna to locate the position, a comparatively large error (several meters to high-teen meters) occurs in position information. Therefore, if another person is present near the detection target, it is difficult to distinguish one from the other in an image.

There are conventionally known some technologies of detecting an object from a camera image by only image processing. However, most of these technologies cause frequent occurrence of miss detection in the environment in which humans normally live, although being usable under very restricted conditions, and thus application of these technologies is difficult. Reasons for this are that the dynamic range of a camera itself is limited, that various objects other than the detection target and the background exist, and that the image of one target at the same position may change in various ways with change of sunshine and illumination.

The visual mechanism of the human can detect a target accurately even in an environment having a large change by utilizing an enormous amount of knowledge and rules acquired from experience. Currently, it is greatly difficult to incorporate knowledge and rules as those acquired by the human in equipment. In addition, an enormous processing amount and memory amount will be necessary to achieve such processing, and this will disadvantageously increase the processing time and the cost.

In view of the above problems, an object of the present invention is providing an object detection technology permitting precise detection of the position, posture and the like of a detection target in an image without requiring an enormous processing amount.

DISCLOSURE OF THE INVENTION

The object detection equipment of the present invention includes: an imaging section for taking an image; a tag communication section for receiving tag information transmitted from an information tag attached to a given target; and a target detection section for detecting the given target in the image taken by the imaging section using the tag information received by the tag communication section.

Accordingly, the target detection section uses tag information transmitted from an information tag attached to a given target in detection of the given target in an image taken by the imaging section. That is, information unobtainable from the image can be obtained from the tag information or retrieved based on the tag information, and such information can be utilized for image processing. Therefore, a given target can be detected precisely from an image without requiring an enormous processing amount.

In the object detection equipment of the present invention, preferably, the tag information includes attribute information representing an attribute of the given target, and the target detection section performs the detection using the attribute information included in the tag information received by the tag communication section.

In the object detection equipment of the present invention, preferably, the tag information includes ID information of the given target, the object detection equipment further includes: an attribute storage section for storing a correspondence between ID information and attribute information; and an attribute lookup section for looking up contents of the attribute storage section using the ID information included in the tag information received by the tag communication, to obtain attribute information of the given target, and the target detection section performs the detection using the attribute information obtained by the attribute lookup section.

Preferably, the target detection section includes: an image segmentation portion for determining a partial image area having the possibility of including the given target in the image; and an image recognition portion for detecting the given target in the partial image area determined by the image segmentation portion, and at least one of the image segmentation portion and the image recognition portion performs processing by referring to the attribute information.

In the object detection equipment of the present invention, preferably, the tag information includes position information representing a position of the information tag, and the target detection section performs the detection by referring to the position information included in the tag information received by the tag communication section.

In the object detection equipment of the present invention, preferably, the tag communication section estimates a position of the information tag from a state of reception of the tag information, and the target detection section performs the detection by referring to the position estimated by the tag communication section.

In the object detection equipment of the present invention, preferably, the tag information includes a detection procedure for the given target, and the target detection section performs the detection by executing the detection procedure included in the tag information received by the tag communication section.

In the object detection equipment of the present invention, preferably, the target detection section performs the detection with only image processing without use of the tag information when a reception state of the tag communication section is bad.

The object detection server of the present invention receives an image taken by an imaging section and tag information transmitted from an information tag attached to a given target, and detects the given target in the image using the tag information.

The object detection method of the present invention includes the steps of: receiving an image taken by an imaging section; receiving tag information transmitted from an information tag attached to a given target; and detecting the given target in the image using the tag information.

BRIEF DESCRIPTION OF THE DRAWINGS

FIG. 1 is a block diagram showing a configuration of object detection equipment of Embodiment 1 of the present invention.

FIG. 2 is a block diagram conceptually showing an inner configuration of an information tag in Embodiment 1 of the present invention.

FIG. 10 shows an example of information used for generation of a template.

BEST MODE FOR CARRYING OUT THE INVENTION

Figure 3:
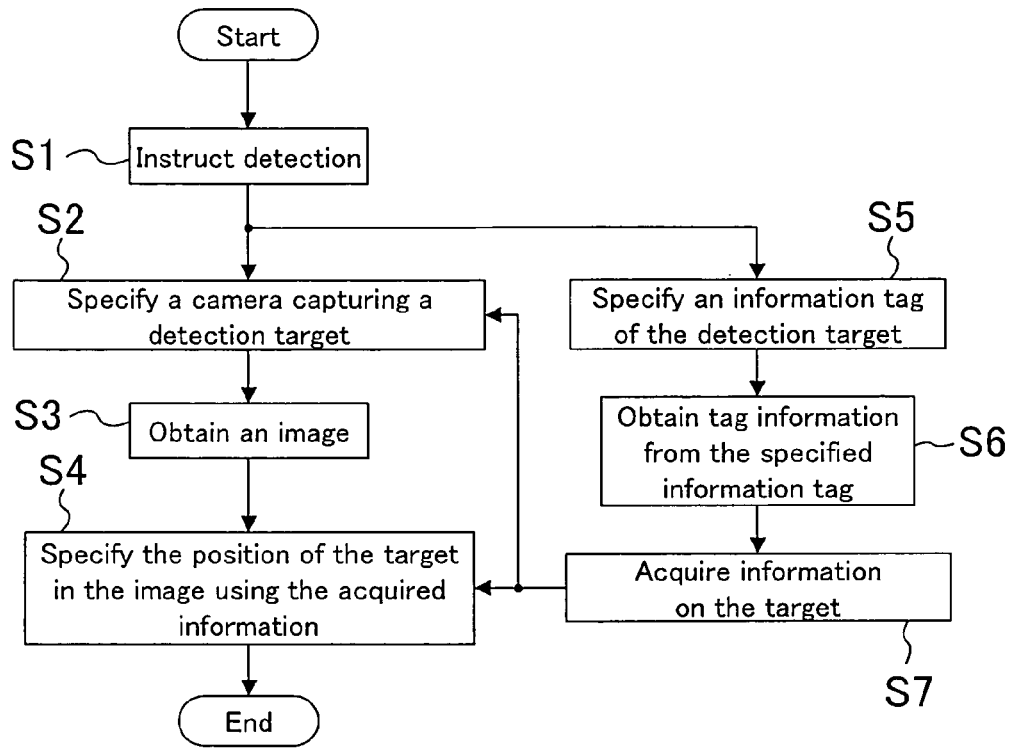
FIG. 3 is a flowchart showing a flow of processing of object detection in Embodiment 1 of the present invention.

Hereinafter, embodiments of the present invention will be described with reference to the drawings. Note that a component common in a plurality of drawings is denoted by the same reference numeral, and the detailed description thereof may be omitted in some cases.

(Embodiment 1)

FIG. 1 is a block diagram showing a configuration of object detection equipment of Embodiment 1 of the present invention. In the configuration of FIG. 1, a person P is a detection target. Referring to FIG. 1, a tag communication section 12 receives tag information transmitted from an information tag 11 attached to the person P. An imaging section 13 takes images. A target detection section 14 detects the person P in the image taken by the imaging section 13 using the tag information received by the tag communication section 12. The imaging section 13 is placed at a position at which images including the person P can be taken.

FIG. 2 is a block diagram conceptually showing an internal configuration of the information tag 11. Referring to FIG. 2, a communication portion 110 communicates with the tag communication section 12 in a noncontact manner via a radio wave, an acoustic wave, light or the like, and sends predetermined tag information. A storage portion 111 stores attribute information (height, age, sex and the like), ID information and the like of the person P to which the information tag 11 is attached, for example, as tag information. A position detection portion 112 detects the position of the information tag 11 with a positioning system using an artificial satellite such as the Global Positioning System (GPS), for example, and outputs the result as tag information. The information tag 11 transmits tag information output from its storage portion 111 and position detection portion 112 via its communication portion 110.

The information tag 11 may be attached to a mobile phone carried by the person P, for example. Both the storage portion 111 and the position detection portion 112 may be used, or either one of them may be used. As a positioning system for providing the position information other than the GPS, a system based on measurement of the distance of a mobile phone or a PHS (Personal Handy-phone System) from its base station, for example, may be used.

The configuration of FIG. 1 also includes: an attribute storage section 16 for storing the correspondence between ID information and attribute information; and an attribute lookup section 15 for obtaining attribute information of the person P by looking up the stored contents of the attribute storage section 16 using the ID information included in the tag information received by the tag communication section 12.

The ID information as used herein refers to a code or a mark associated in advance with each target. The ID information may be given for each individual as the target or for each category the target belongs to. For example, in the case that the target is a person as in this embodiment, ID information unique to each person may be given, or ID information unique to each family and common to the members of the family may be given. In the case that the target is an object such as a pen, for example, ID information unique to each pen may be given, or ID information unique to each color and shape and common to pens having the same color and shape may be given.

The target detection section 14 detects the person P from images taken by the imaging section 13 using the tag information received by the tag communication section 12 and/or the attribute information obtained by the attribute lookup section 15. The target detection section 14 includes an image segmentation portion 141 and an image recognition portion 142.

The image segmentation portion 141 determines a partial image area having the possibility of including the person P in an image taken by the imaging section 13. When the GPS or the like is used for detection of the position of the information tag 11 as described above, a large error is less likely to occur. However, it is still difficult to attain high-precision position detection and acquire detailed information such as the posture and face position of a person. This is due to theoretical limitation of the precision of a sensor, influence of an error and disturbance in the actual use environment, actual limitation of the number of sensors usable and other reasons. As for the image processing, the partial image area can be determined with comparatively high precision under idealistic conditions (situation where the illumination little varies or changes and only a limited object is captured, for example). However, miss detection is likely to occur in the situation where various objects exist and the illumination varies, as in images taken outdoors.

The image segmentation portion 141 uses the tag information and the attribute information in integration with the image, so that the partial image area can be determined with higher precision. A plurality of partial image areas may be determined. Such an area may not be detected if there is no possibility of existence of a detection target.

The image recognition portion 142 detects whether or not the person P exists in the partial image area determined by the image segmentation portion 141 and, if the person P exists, detects the position, posture and motion of the person P. As described above, a large error is less likely to occur in the position information from the information tag 11, but it is difficult to acquire high-precision information and detailed information from the position information. As for use of only image processing, it is difficult to detect unspecified many persons with high precision. In view of these, the image recognition portion 142 uses the height of the person P, for example, as the tag information or the attribute information, and this improves the precision of image recognition processing. For example, when template matching is adopted as the recognition technique, the size of a template may be set according to the height of the person P. This improves the detection precision, and also reduces the processing amount because the template used for the recognition processing can be narrowly defined.

As described above, in the configuration of FIG. 1, by using the tag information received by the tag communication section 12 and the attribute information obtained by the attribute lookup section 15 in integration with an image, the person P as a given target can be detected in the image with high precision while suppressing increase of the processing amount.

FIG. 3 is a flowchart showing a flow of object detection processing in this embodiment. In this flow, the processing using an image (S2, S3 and S4) and the information acquiring processing using an information tag (S5, S6 and S7) may be performed in parallel with each other. Referring to FIG. 3, first, an instruction of detection of a given target is issued (S1). The target may be designated by the user of the system or by a person to be detected himself or herself. Alternatively, the target may be automatically designated according to the time and the place, or all of targets of which tag information can be obtained from respective information tags may be designated.

Thereafter, a camera supposed to capture the detection target is specified (S2). When a plurality of cameras are used as will be described later, all of cameras capable of capturing the target are selected. In this example, a camera having the possibility of capturing the detection target may be designated in advance, or a camera may be selected using the position information of an information tag obtained in step S7 to be described later. Images are then obtained from the camera specified in the step S2 (S3).

An information tag associated with the designated target is specified (S5). Tag information is then obtained from the specified information tag (S6), and information on the target is acquired from the obtained tag information (S7). The acquired information includes the attribute information such as the height, age and sex read from the attribute storage section 16 and the position information and the like included in the tag information, for example. Finally, detailed information such as the position of the target is specified in the image obtained in the step S3 using the information acquired in the step S7 (S4).

Figure 4:
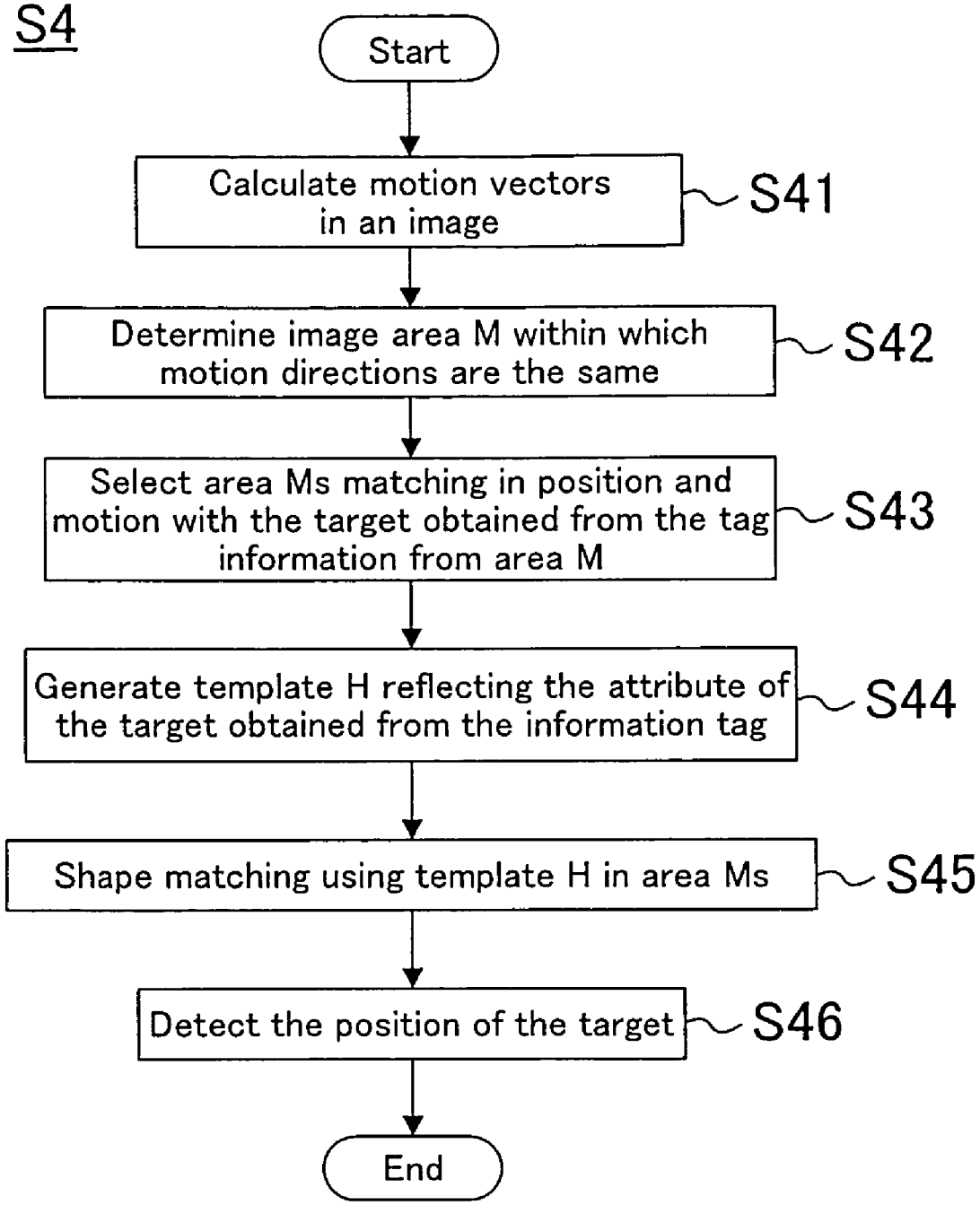
FIG. 4 is a flowchart showing an example of processing in step S4 in FIG. 3.

FIG. 4 is a flowchart showing an example of processing in the step S4. First, motion vectors in an image are computed (S41). A set M of image areas within which the directions of vectors are the same in the image is determined using the motion vectors (S42). An area of which the position and motion match with the position and motion of the target acquired from the information tag is then selected from the image area set M as a set Ms (S43). A template H in the shape of a human is then generated to reflect the attributes such as the height, age and sex acquired from the information tag (S44). Shape check using the human-shaped template H generated in the step S44 is conducted in the image area set Ms (S45). Finally, the position giving the highest degree of matching in the shape check in the step S45 is detected as the position of the target (S46).

The processing in this embodiment will be described in more detail with reference to FIGS. 5 to 9.

Figure 5:
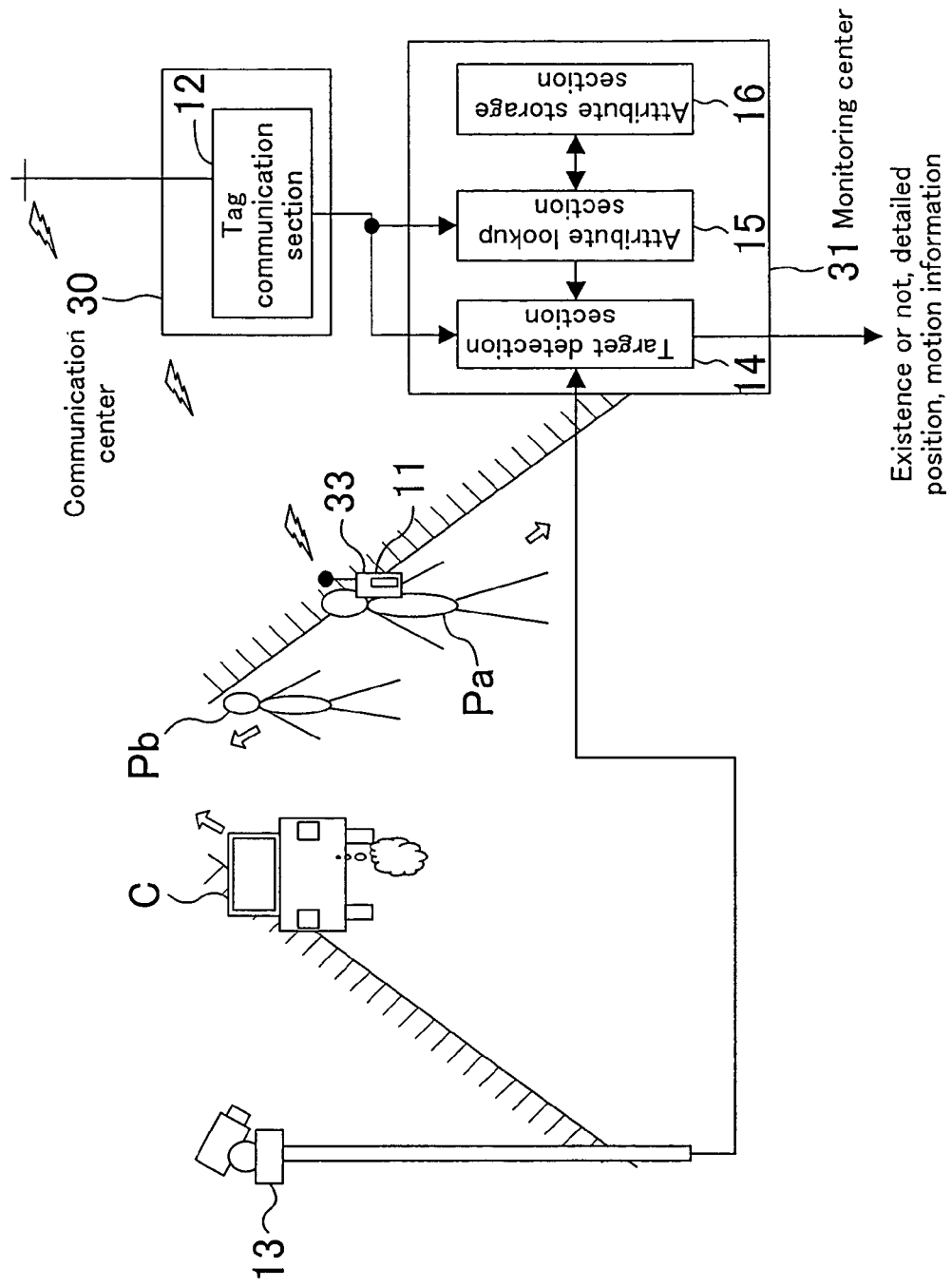
FIG. 5 is a view showing a situation of the object detection in Embodiment 1 of the present invention.

In FIG. 5, the tag communication section 12 is in a communication center 30, while the target detection section 14, the attribute lookup section 15 and the attribute storage section 16 are in a monitoring center 31. Assume herein that a given person Pa carrying an information tag 11 (attached to a mobile phone 33) is detected with a camera (imaging section 13) placed outdoors on the side of a street. The information tag 11 transmits ID information of the person Pa and rough GPS position information (error of about 10 m). In the communication center 30, the tag communication section 12 receives the information transmitted from the information tag 11. The monitoring center 31 as the object detection server obtains an image from the camera 13 and the tag information received in the communication center 30 via a communication network. The attribute storage section 16 stores attribute information such as the height, age and sex associated with ID information.

Assume that currently a person Pb and a car C exist near the person Pa and that the person Pa is moving toward the imaging section 13 while the person Pb and the car C are moving away from the imaging section 13. At this moment, an image as shown in FIG. 6 is taken with the camera 13, in which the persons Pa and Pb and the car C are captured.

First, the image segmentation portion 141 of the target detection section 14 executes the steps S41 to S43 shown in FIG. 4, to determine a partial image area having the possibility of including the person Pa.

Figure 6:
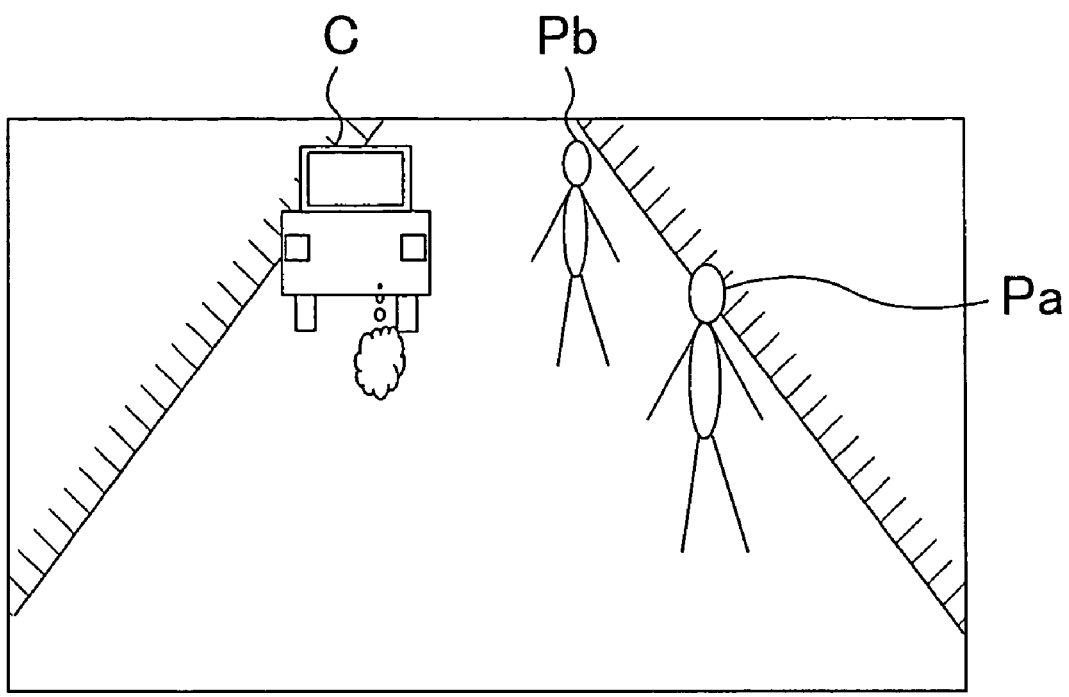
FIG. 6 shows an example of an image taken by an imaging section in the situation of FIG. 5.
Figure 7:
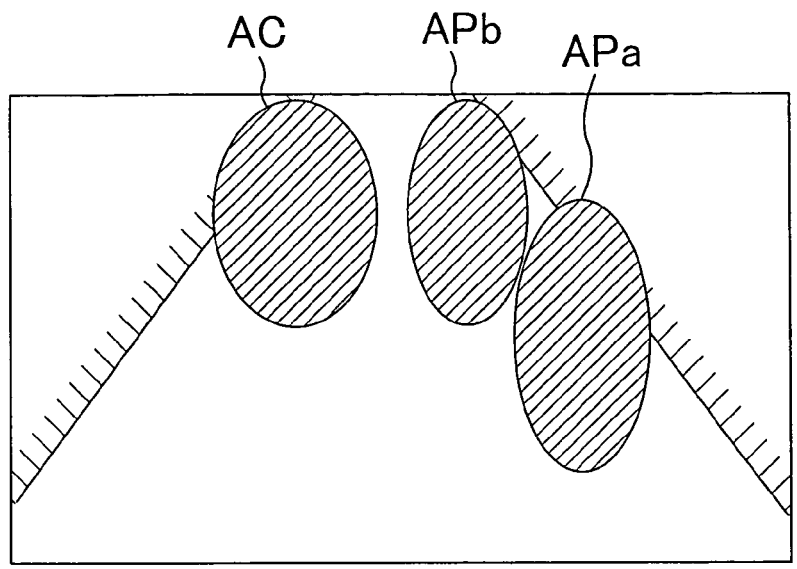
FIG. 7 is a view showing candidate areas determined by an image segmentation portion in the image of FIG. 6.

Specifically, motion vectors in the image of FIG. 6 are computed, to determine image areas within which the directions of vectors are the same. FIG. 7 shows the areas obtained in this way. In FIG. 7, areas APa, APb and AC are formed at and around the positions of the persons Pa and Pb and the car C, respectively.

Figure 8:
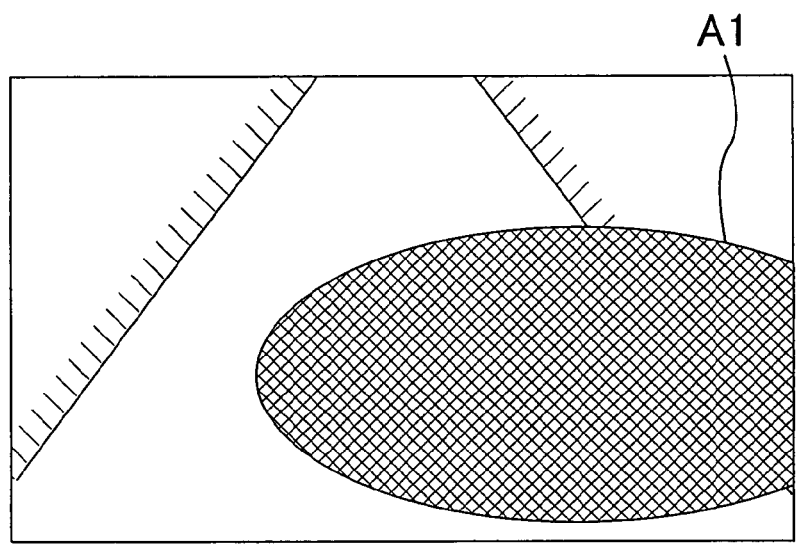
FIG. 8 is a view showing a candidate area determined using position information obtained from the information tag, in the image of FIG. 6.

An area of which the position and motion match with the position and motion of the person Pa obtained from the tag information is then selected from the areas shown in FIG. 7. FIG. 8 shows a candidate area determined when only the position information obtained from the information tag 11 is used. In FIG. 8, the position specified by the position information is transformed to the position on the camera image, which is shown as an area A1. Since the position information from the GPS includes an error, a large area including the persons Pa and Pb is given as the candidate area A1 considering a possible error. From FIGS. 7 and 8, the overlap areas, that is, the areas APa and APb are considered as candidate areas. Thus, the area AC of the car C can be excluded by using the position information of the person Pa.

Figure 9:
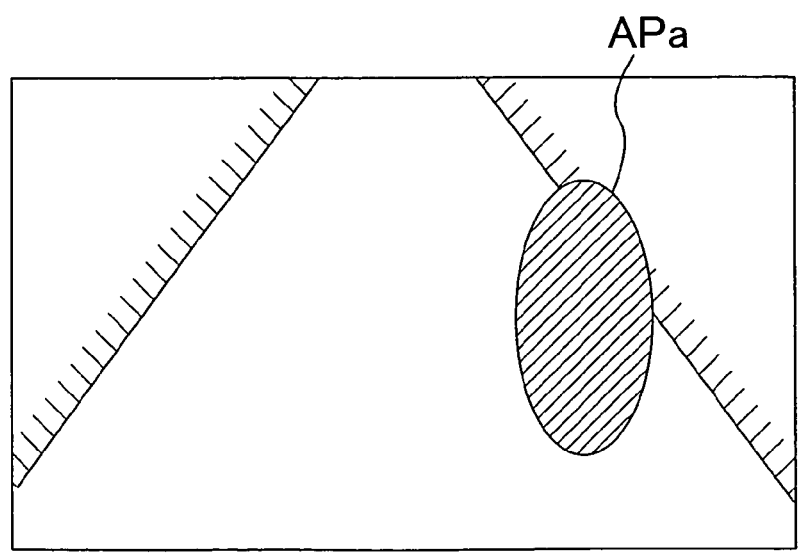
FIG. 9 is a view showing an area determined from the candidate areas shown in FIGS. 7 and 8.

Further, from a change in position information, it is found that the target is moving forward. Therefore, by checking the directions of the motion vectors in the areas APa and APb, the candidate area can be narrowed to only the area APa as shown in FIG. 9.

Thereafter, the image recognition portion 142 of the target detection section 14 executes the steps S44 to S46 in FIG. 4, to specify the position and posture of the person Pa in the image. That is, template matching is performed for the area APa to detect the position and motion of the person Pa more accurately.

Use of an unnecessarily large number of templates will increase the possibility of erroneously detecting a person/object different from the detection target, and also will require a vast amount of processing for matching. Therefore, the template used for the matching is narrowly defined according to the attribute information such as the height, age and sex obtained by the attribute lookup section 15. In this way, the detection precision can be improved, and the processing amount can be reduced.

An example of how the template is narrowly defined will be described. FIG. 10 shows an example of information used for generation of templates, in which the height range, the average body type and the average clothing size are shown for each of age brackets (child, adult, senior). Assume that the age of the person Pa is found to be "20" from the attribute information. Since this age belongs to the age bracket "adult", the average height and body type can be obtained from the relationship shown in FIG. 10. The obtained height and body type are transformed to the size and shape on the camera image, to thereby generate a shape template used for the matching.

When the height range has a certain width, a plurality of templates different in size may be generated within the height range. If the exact height of a target is directly obtainable as attribute information, this height value may be used. If the information tag is attached to the clothing of the target and the size of the clothing is obtained as tag information, the height of the target can be obtained from the relationship shown in FIG. 10, to generate a template.

Once the accurate position of the person Pa in the area APa is detected from the template matching, the change of the position with time may be followed, to obtain the accurate motion of the person Pa. If shape templates of different postures are used, the posture of the person Pa can also be detected. Each template used for the matching may be a gray-scale image or a binary image representing the shape or a color image including a color, or else may be an image merely representing the outline.

Once the accurate position of the person Pa is successfully detected in the image, the camera can zoom in on the person Pa to capture only the person Pa, for example. Alternatively, the zooming rate may be lowered so that the surroundings of the person Pa are captured at all times. This enables continuous monitoring of not only the state of the person Pa but also how the person Pa comes into contact with neighboring persons. This will be useful for crime investigation, behavior investigation and the like.

As described above, in this embodiment, in detection of a given target Pa in an image, tag information transmitted from the information tag 11 attached to the target Pa is used. In this way, information that will not be obtainable from the image can be obtained from the tag information itself (for example, attribute information and position information transmitted from the information tag 11) or can be retrieved using the tag information (for example, attribute information read from the attribute storage section 16), and such information can be utilized in image processing. This enables detection of a given target in an image without requiring an enormous processing amount.

In this embodiment, both the image segmentation portion 141 and the image recognition portion 142 refer to the information from the tag communication section 12 and the attribute lookup section 15. Instead, either one of the image segmentation portion 141 and the image recognition portion 142 may refer to the information from the tag communication section 12 and the attribute lookup section 15, and the other may perform the processing using only the image information.

In this embodiment, the information tag 11 is attached to a mobile phone carried by the person Pa. Alternatively, the information tag 11 may be attached to other portable equipment such as a PDA. The information tag 11 may otherwise be attached to something carried by a target person such as a stick and a basket, something moving together with a target person such as a wheelchair and a shopping cart, or something worn by a target person such as clothing, glasses and shoes. The information tag 11 may even be embedded in the body of a target person.

In this embodiment, the information tag 11 transmits attribute information stored in the storage portion 111 and position information detected by the position detection portion 112. The information to be transmitted is not limited to these. For example, the information tag 11 may transmit information on the motion of the detection target obtained using an acceleration sensor, a compass, a gyro device and the like, or may transmit information on the posture of the detection target obtained using a gyro device and the like. In the case of transmission of the posture, the template used for the recognition by the image recognition portion 142 can be limited to a shape template having a specific posture. This enables further improvement in detection precision and reduction in processing amount.

The attribute information stored in the information tag 11 and the attribute storage section 16 is not limited to that described in this embodiment. For example, when a person is a target to be detected, the skin color and the hair color may be stored as attribute information. The image segmentation portion 141 may detect an area having a specific color, or the image recognition portion 142 may use a template reflecting a specific skin color or hair color. By this processing, improvement in detection precision is expected.

History information on a detection target, such as the detection time, the detection position, the motion speed and the clothing, may be stored as attribute information. By comparing such history information with information currently obtained, whether or not the detection result has an abnormality can be determined.

The detection target is not limited to a person, but may be a pet or a car, for example. When a pet is to be detected, an information tag may be attached to a collar and the like. By capturing with a camera indoors, detailed images of a pet can be obtained and the behavior of the pet can be grasped from a distant place. In this case, if the state of a pet is to be checked with a small display screen such as that of a mobile phone, an image covering the entire room will fail to give a grasp of the state of the pet. According to the present invention, in which the position of the pet in an image can be accurately detected, only an image area including the pet can be displayed on the small display screen. Thus, the state of the pet can be easily grasped.

In the case of monitoring cars with an outdoor monitoring system and the like, information tags may be attached to cars in advance. With the information tag, the position of a specific car can be detected accurately in a monitoring image, and thus an image of the driver of the car can be easily acquired automatically, for example. This can be used for theft prevention and the like.

<Use of Motion Trajectory>

In the example described above, in the integrated use of the image information and the information obtained from the information tag, the candidate area was narrowed using the position and motion direction of the detection target. The present invention is not limited to this, but the motion trajectory, for example, may be used, as will be described below.

Assume in this case that, in the environment shown in FIG. 5, the car C does not exist and both the person Pa carrying the information tag 11 and the person Pb are walking toward the camera 13 although the walking trajectories are different between the persons Pa and Pb.

Figure 11:
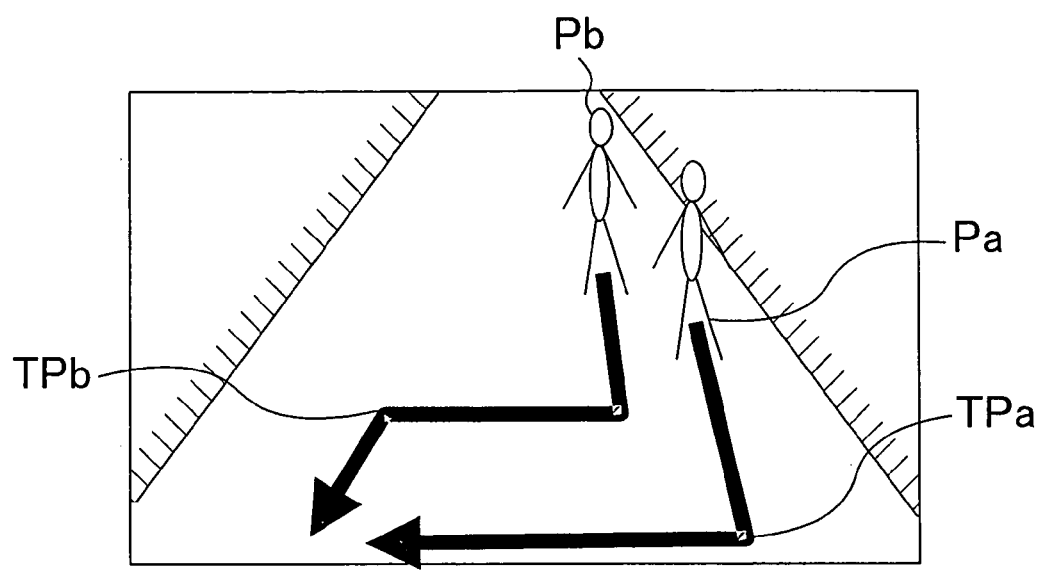
FIG. 11 is a view showing motion trajectories obtained from an image.

FIG. 11 shows an image taken with the camera 13 in the above situation. In FIG. 11, motion trajectories TPa and TPb obtained from images are shown by the solid arrows. Although the image processing can provide detailed motion trajectories, it finds difficulty in distinguishing the person Pa from the person Pb.

Figure 12:
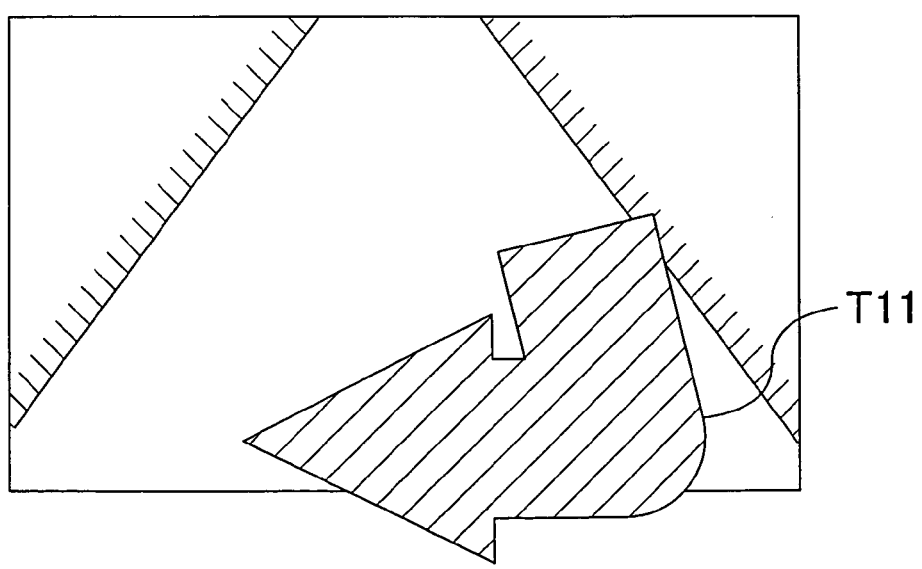
FIG. 12 is a view showing a motion trajectory based on the position information obtained from the information tag.

FIG. 12 shows a motion trajectory T11 based on the position information obtained from the information tag 11. With low precision of the position information, the error range of the position is represented by the width of the arrow in FIG. 12. Although the precision is low, the position information can provide the outline of the motion trajectory.

The motion trajectory T11 in FIG. 12 is compared with the trajectories TPa and TPb in FIG. 11 to determine the similarity. In the illustrated example, the trajectory TPa is higher in the similarity to the motion trajectory T11. Therefore, the person Pa is specified as the detection target, and the accurate position of the person Pa in the image is obtained.

As described above, by use of the similarity of motion trajectories, persons and objects comparatively similar in position and motion direction to each other can be distinguished from each other. The similarity of motion trajectories can be determined by calculating the proportion of the range of overlap of the trajectories, comparing the lengths of the trajectories, comparing the positions at which the trajectories change the direction, or comparing motion vector series, for example.

<Use of a Plurality of Cameras>

Figure 13:
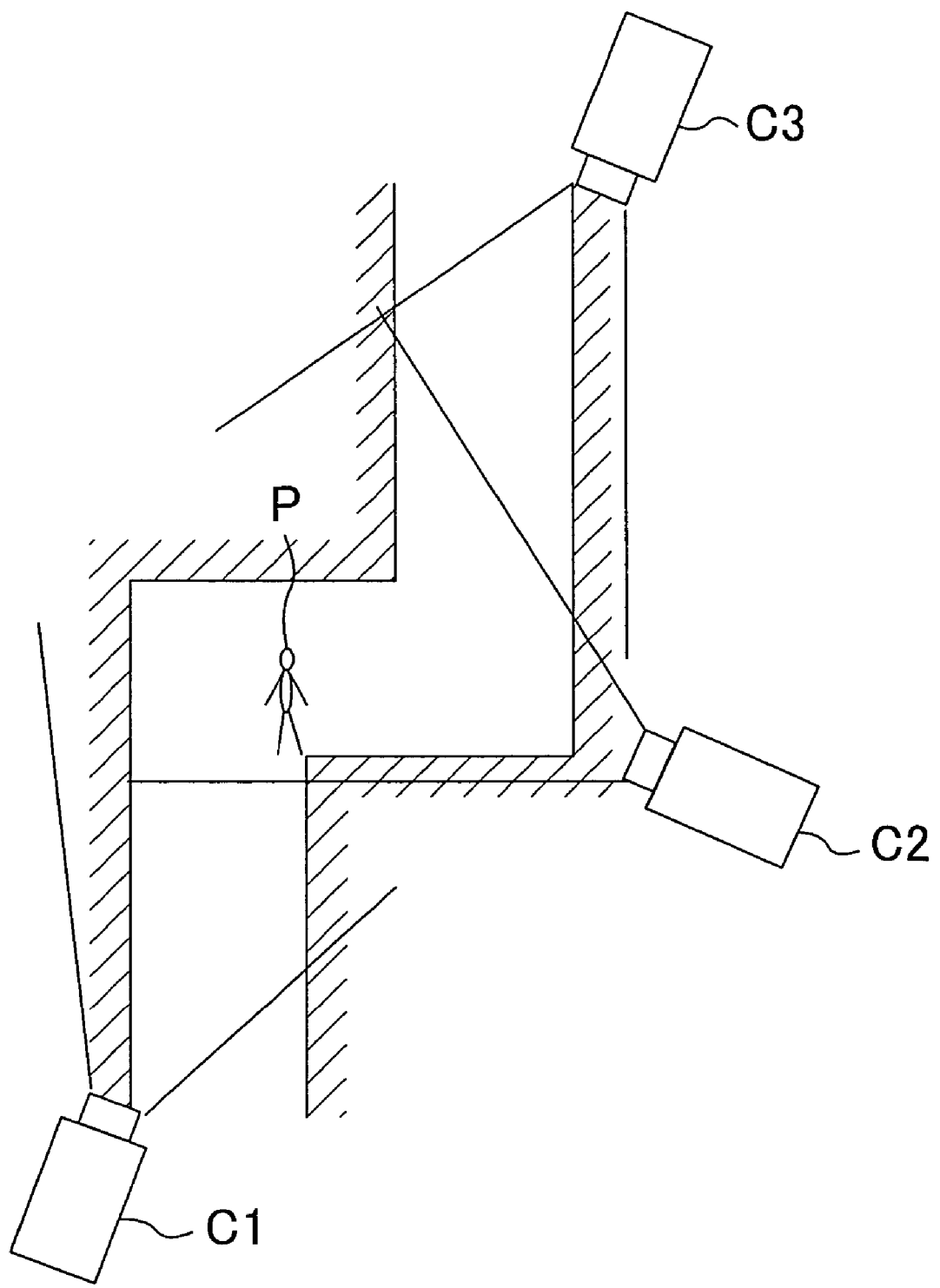
FIG. 13 is a view showing an example of placement of a plurality of cameras.

Although one camera was used in the example described above, it is needless to mention that a plurality of cameras may be used. For example, as shown in FIG. 13, in monitoring in an out-of-sight place, a plurality of cameras C1 to C3 may be placed to prevent existence of a blind spot. In a cranked path as shown in FIG. 13, a person P will fall outside the image taken with the camera C1 only by moving a few steps rightward. Therefore, even with the camera placement free from a blind spot, if the accurate position of the person P is unknown, it will be difficult to select a suitable camera to follow the person P. By adopting the present invention, an out-of-sight place can be monitored over a wide area, and the position of the person P can be specified in images.

In other words, a camera capable of capturing the person P can be specified based on the position information obtained from the information tag. When the person P is at the position shown in FIG. 13, a camera image giving the largest figure of the person P, out of the images from the cameras C1 and C2, can be displayed automatically by detecting the person P using the tag information.

<Linking of Position Information of Information Tag with Image Coordinates>

For realization of the present invention, the position indicated by the position information of an information tag 11 must be linked in advance with coordinates in a camera image. This will be described briefly.

The position information of an information tag 11 is linked with image coordinates using a coordinate transformation T for transforming position coordinates (world coordinates) in the three-dimensional space in which a detection target exists to coordinates in a camera image. By determining the coordinate transformation T in advance, it is possible to link the position coordinates of an information tag with coordinates in an image.

In general, the coordinate transformation T may be theoretically computed based on the layout of a camera (the focal distance of a lens, the lens distortion characteristic, the size and number of pixels of an imaging device) and the conditions of placement of the camera (the position and posture of the camera), or may be determined with a procedure of camera calibration to be described later. When the camera layout and the camera placement conditions are known, the coordinate transformation T can be determined by doing a combined calculation including geometric transformation and the like. When the camera layout and the camera placement conditions are not known, the coordinate transformation T can be determined by camera calibration.

Figure 14:
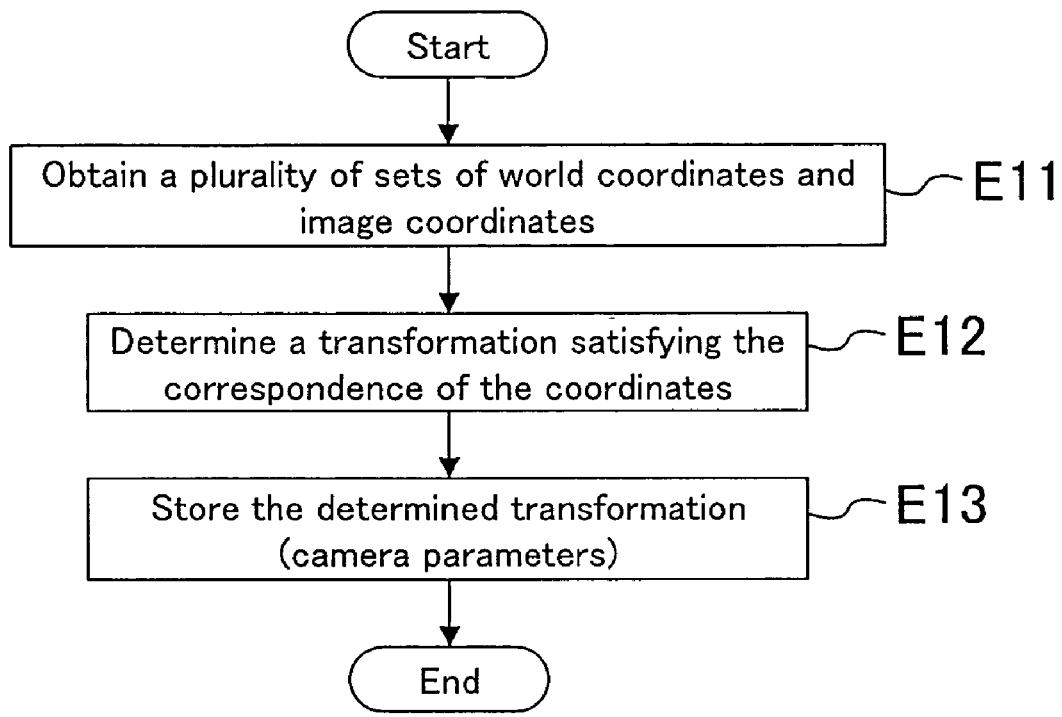
FIG. 14 is a flowchart showing a method of determining coordinate transformation of transforming spatial position coordinates of a detection target to image coordinates by camera calibration.

A method for determining the coordinate transformation T by camera calibration will be described with reference to the flow shown in FIG. 14. Assume in this description that the position, posture and zoom of the camera are fixed. First, at least six sets of position coordinates in a three-dimensional space in which a detection target exists (world coordinates) and the corresponding position coordinates in an image (image coordinates) are prepared (E11). A linear transformation satisfying the correspondence of the sets of the coordinates prepared in the step E11 is determined by the method of least squares and the like (E12). Parameters of the linear transformation computed (camera parameters) are stored (E13).

The stored camera parameters may be used for subsequent transformation of the position coordinates of an information tag to image coordinates.

When the position, posture and zoom of the camera is changed, a coordinate transformation for the state after the change may be prepared again by the camera calibration. If a sensor is separately provided to detect the position, posture and zoom (focal distance of a lens) of a camera, new parameters can be determined by calculation. For a camera of which the position and posture frequently change, such as a camera placed in a mobile unit like a robot and a car, it is desirable to detect the position and posture of the camera with a separate sensor, and determine camera parameters by calculation every time a change is detected.

(Embodiment 2)

In Embodiment 2 of the present invention, assume that a camera-equipped movable robot detects an object as a given detection target.

Figure 15:
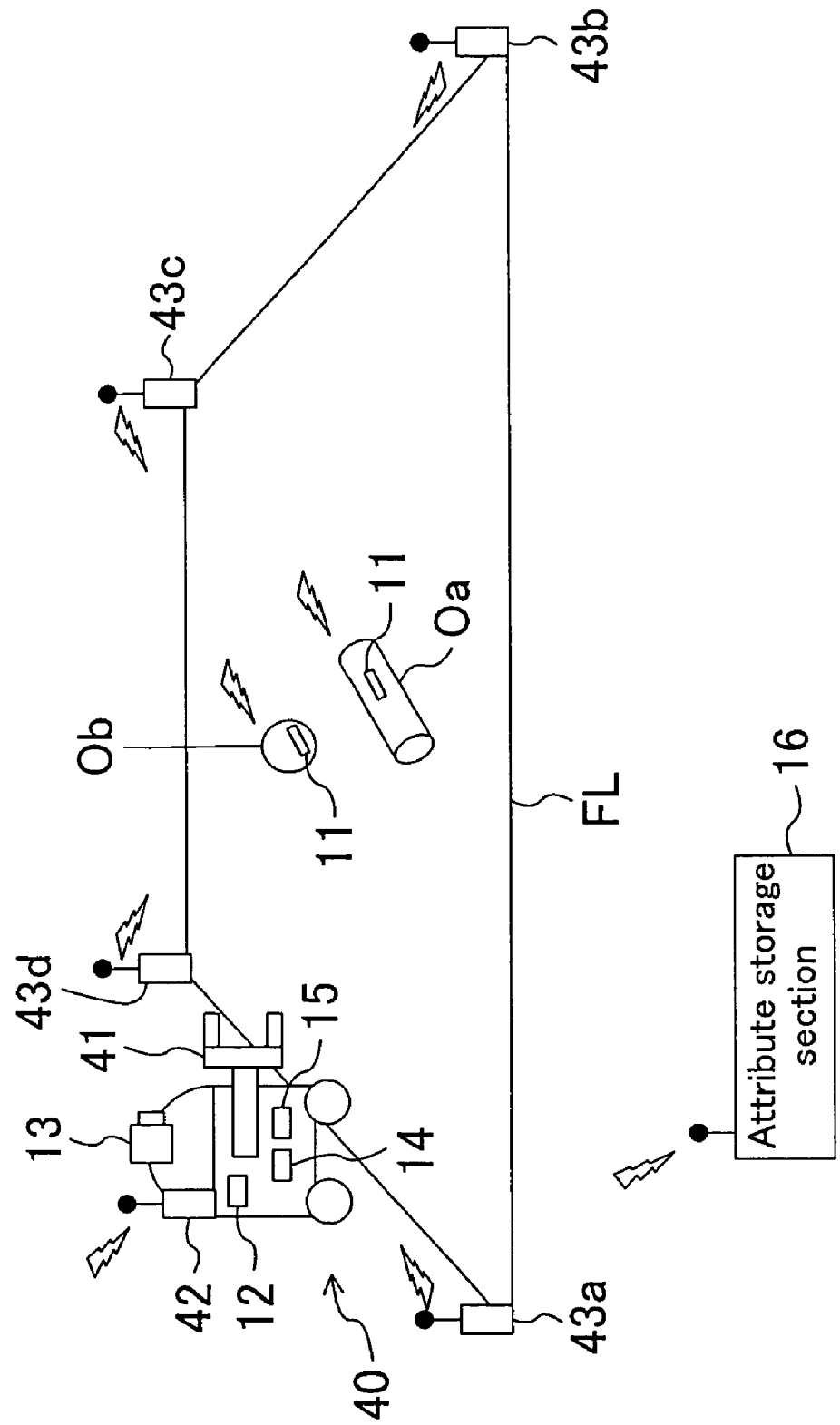
FIG. 15 is a view showing a situation of object detection in Embodiment 2 of the present invention.

FIG. 15 shows a situation in this embodiment. Referring to FIG. 15, a movable robot 40 is placed on a floor FL in a house. The robot 40 as object detection equipment includes a camera 13 as the imaging section, as well as the tag communication section 12, the target detection section 14 and the attribute lookup section 15 described in Embodiment 1. The attribute storage section 16 is placed at a position different from the robot 40 so that the attribute lookup section 15 can refer to attribute information stored in the attribute storage section 16 via radio communication.

A cylindrical object Oa in a fallen state and a spherical object Ob, which are both red, are on the floor FL. An information tag 11 is embedded in each of the objects Oa and Ob and transmits ID information as tag information. Antennas 43a to 43d are placed at the four corners of the floor FL, to allow the information transmitted from the information tag 11 to be received by the tag communication section 12 via an antenna 42 of the robot 40 by way of the antennas 43a to 43d. The attribute lookup section 16 reads the shape and color of the object from the attribute storage section 16 as attribute information. The tag communication section 12 estimates a rough position of the information tag 11 from the ratio of the reception intensity among the antenna 43a to 43d placed at the four corners.

Assume that the robot 40 moves, catches hold of the object Oa or Ob as a given detection target with its hand and moves the object. To catch hold of an object with a hand 41, the robot 40 must accurately detect the position, shape and orientation of the object.

Figure 16:
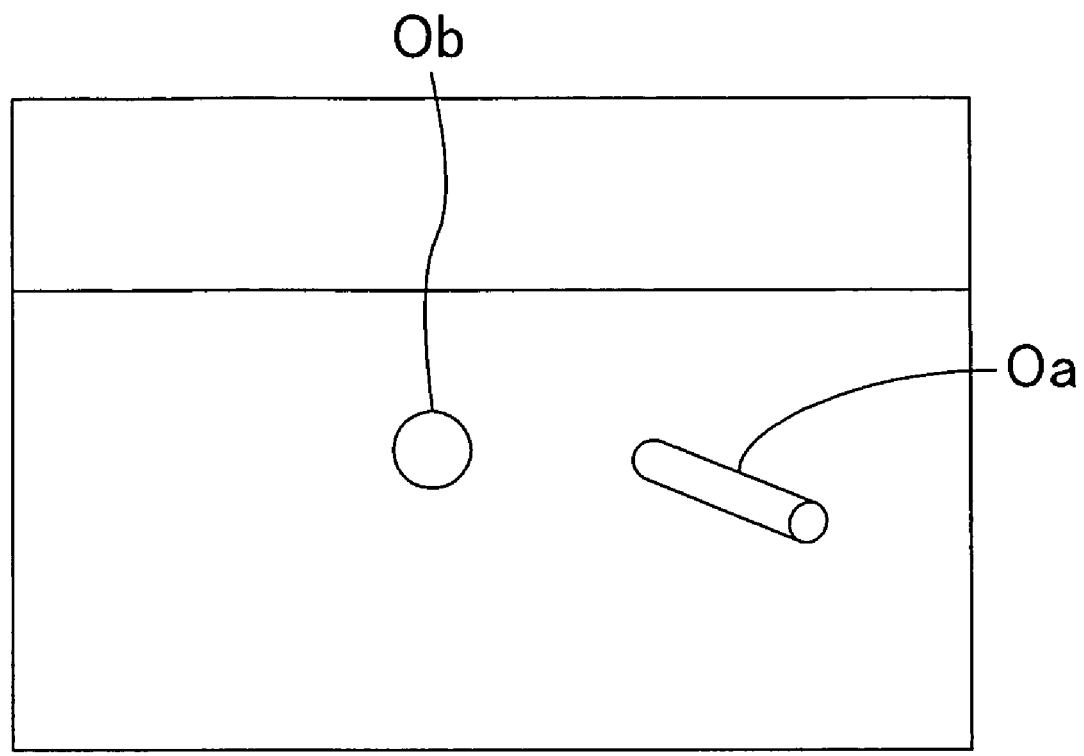
FIG. 16 shows an example of an image taken by an imaging section in the situation of FIG. 15.

FIG. 16 shows an image taken with the camera 13 in the situation shown in FIG. 15. Existence of two kinds of objects is recognized by the ID information from the information tags 11. Rough positions of the information tags 11 are estimated from the ratio of the reception intensity among the antennas 43a to 43d. In this case, therefore, the ID information and the radio intensity are used as information from the information tag 11.

Figure 17:
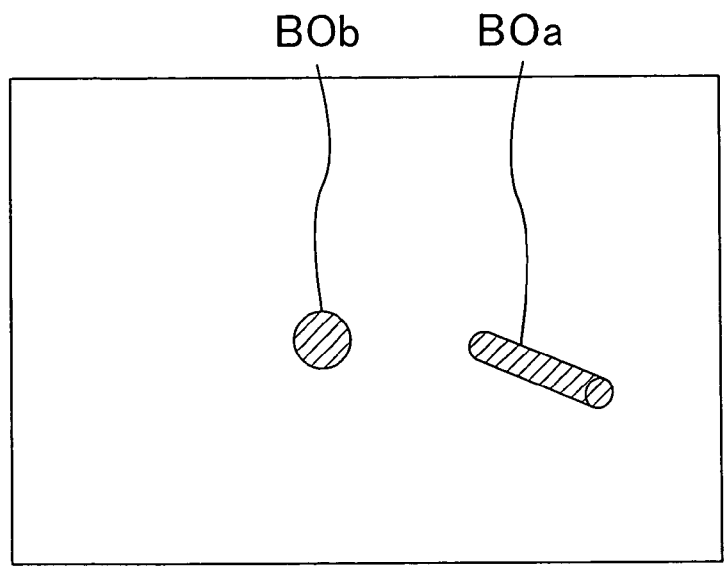
FIG. 17 is a view showing candidate areas determined by an image segmentation portion in the image of FIG. 16.

Assume that as for one of the two kinds of objects, the object Oa, for example, attribute information that the shape is cylindrical and the color is red has been obtained by looking up the attribute storage section 16 using the ID information. In this case, the image segmentation portion 141 (not shown in FIG. 15) of the target detection section 14 determines a candidate area of being red in an image based on the attribute information that the detection target is red. FIG. 17 is an image showing the result of the determination, in which two candidate areas BOa and BOb respectively corresponding to the red objects Oa and Ob are shown.

Figure 18:
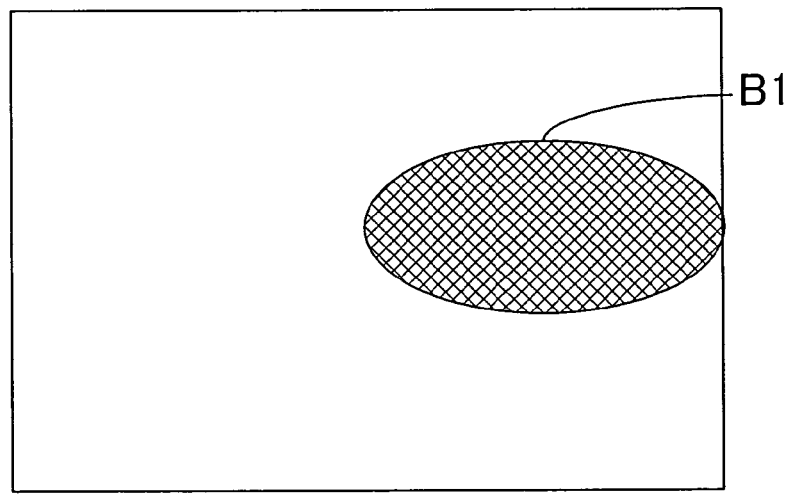
FIG. 18 is a view showing a candidate area determined using position information obtained from an information tag in the image of FIG. 16.
Figure 19:
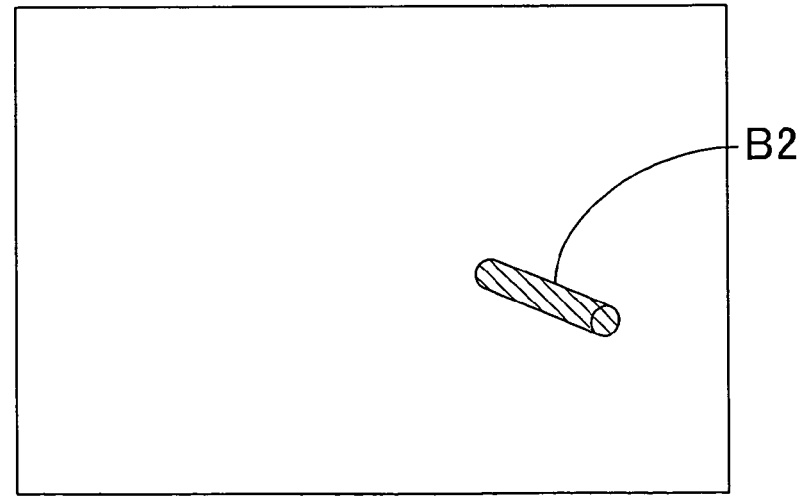
FIG. 19 is a view showing an area determined from the candidate areas shown in FIGS. 17 and 18.

A candidate area B1 as shown in FIG. 18 is obtained based on the position information of the object Oa estimated from the reception intensity. The candidate areas BOa and BOb in FIG. 17 and the candidate area B1 in FIG. 18 are integrated to obtain an area B2 as shown in FIG. 19. In this way, the position of the object Oa is accurately obtained.

The image recognition portion 142 (not shown in FIG. 15) of the target detection section 14 generates shape template images having various orientations a cylindrical object can take, based on the attribute information that the object is cylindrical. Template matching is performed for the image of the area B2 using these shape templates, and the orientation (posture) of the object can be accurately determined from the orientation of an object corresponding to the shape template giving the highest degree of matching.

The position and posture of the other object Ob can also be accurately detected in the manner described above. As a result, the robot 40 can obtain information necessary for moving the objects Oa and Ob with the hand 41. In other words, with the color and shape obtained as attribute information, image segmentation and image recognition can be performed for a specific color and shape, and in this way, highly precise, efficient object detection can be realized.

As described above, by effectively using information obtained from an information tag 11 attached to an object and information of an image, the position and posture of the object can be detected with high precision. Moreover, the processing amount required for the detection can be kept low. This makes it possible to realize object detection required for a robot to work in a complicate environment such as in a room of a house.

Accurate and real-time processing is desired in detection of a target by a robot. Therefore, a technology permitting improvement in detection precision while keeping the processing amount from increasing as that according to the present invention is effective. For example, for robots used for rescue operation, care and the like, a delay of processing may possibly lead to threatening of a human life or injury. Also, assume a case that a robot is intended to come into contact with a specific person among a number of persons.

Even if the specific person is successfully specified accurately, the person will pass by the robot while the robot is still executing the processing if the processing time is excessively long. In such a case, also, by adopting the present invention, the target can be detected in an image swiftly and accurately.

In the example described above, the relationship between the ID information and the attribute information was stored in the attribute storage section 16. Alternatively, the attribute information may be directly stored in the information tag 11 attached to an individual object. By this direct storage, the attribute storage section and the attribute lookup section can be omitted, and thus the system layout can be simplified. On the contrary, when the attribute storage section 16 is provided, the memory capacity of the information tag 11 can be small even when the information amount used for detection increases. This enables reduction of the size and cost of the information tag 11. Also, the communication capacity between the information tag 11 and the tag communication section 12 can be kept from increasing.

A detection procedure itself may be recorded in the information tag 11. For example, in the illustrated example, information on a detection procedure such as "detecting a red object" and "producing cylindrical shape templates and performing shape matching" may be transmitted from the information tag 11 attached to the object Oa. Alternatively, information on a detection procedure may be stored in the attribute storage section 16 in association with the ID information, so as to be read from the attribute storage section 16 based on the ID information received from the information tag 11. In these cases, the target detection section 14 simply executes processing according to the detection procedure received from the information tag 11 or read from the attribute storage section 16. This can simplify a detection program installed in the robot itself. Moreover, even when a different kind of object is additionally provided, no change is necessary for the detection program installed in the robot, and thus the maintenance can be simplified.

(Embodiment 3)

In Embodiment 3 of the present invention, a person as a subject is detected with a portable camera as a given detection target. The portable camera as used herein includes a hand-held video camera, a digital camera, a camera-equipped mobile phone and an information terminal.

Figure 20:
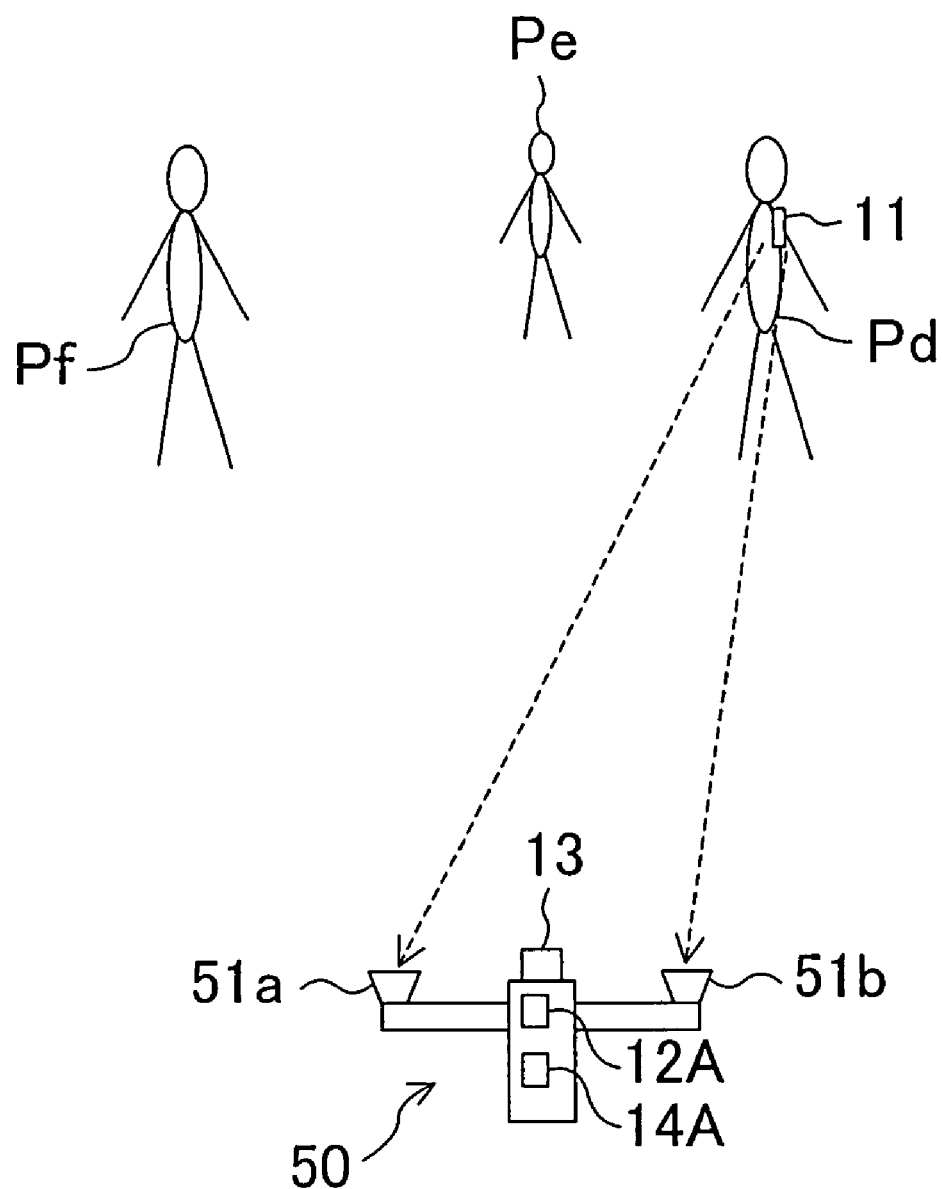
FIG. 20 is a view showing a situation of object detection in Embodiment 3 of the present invention.

FIG. 20 is a view showing a situation in this embodiment, in which a person Pd is photographed with a portable camera 50 having the imaging section 13 outdoors. The person Pd carries an information tag 11, which transmits ID information specifying the person Pd as tag information via ultrasonic wave. When an ultrasonic wave transmitter as that generally used for distance measurement is used, the detection range is about 20 m from the camera, although it varies with the transmission intensity of the ultrasonic wave.

The camera 50 includes two microphones 51a and 51b, a tag communication section 12A and a target detection section 14A. The microphones 51a and 51b receive ultrasonic wave transmitted by the information tag 11. The tag communication section 12A obtains ID information from the ultrasonic signal received by the microphones 51a and 51b, and also computes the direction and distance of the information tag 11 with respect to the camera 50. The direction of the information tag 11 with respect to the camera 50 can be estimated from the time difference (phase difference) or the intensity ratio between ultrasonic signals received by the two microphones 51a and 51b. The distance from the information tag 11 can be estimated from the degree of attenuation (degree at which the intensity and the waveform dulls) of the received ultrasonic signals.

Figure 21:
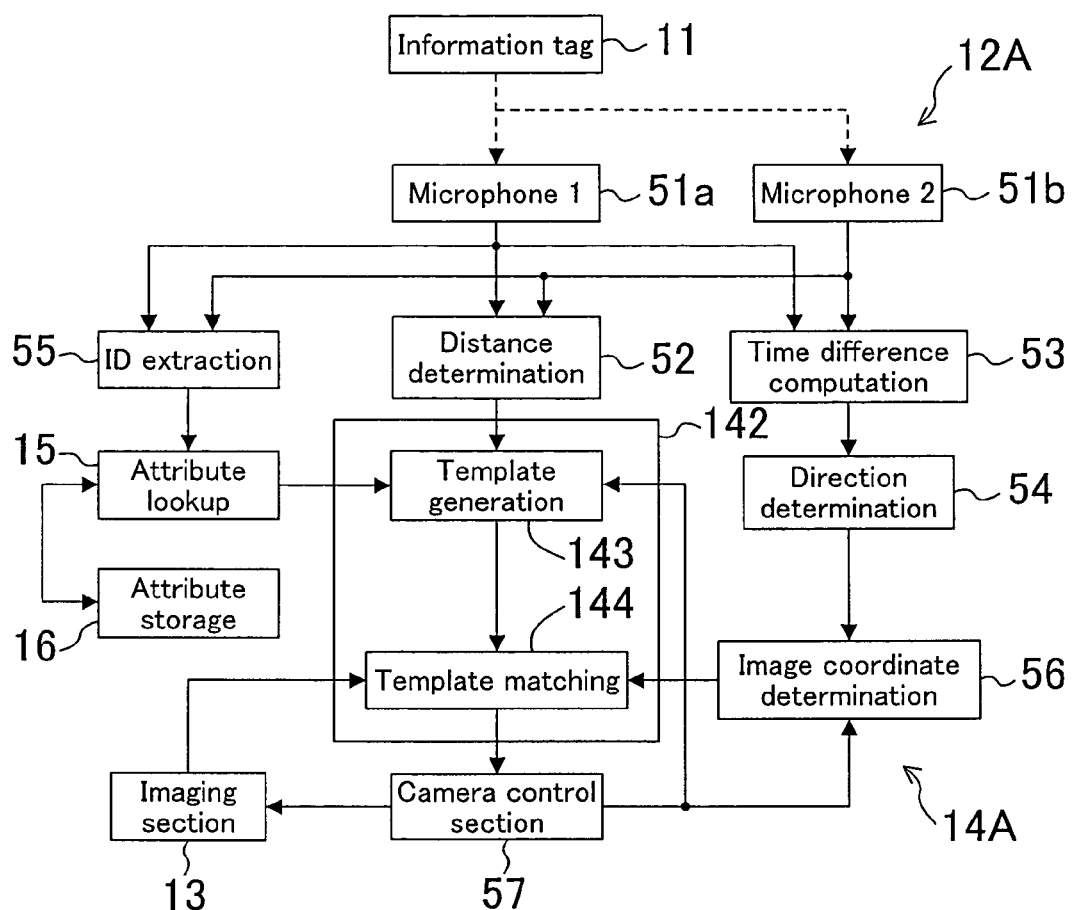
FIG. 21 is a block diagram showing a configuration example of a camera 50 in FIG. 20.

FIG. 21 is a block diagram showing a configuration example of the camera 50 as the object detection equipment. Referring to FIG. 21, the tag communication section 12A is essentially composed of the microphones 51a and 51b, a distance determination portion 52, a time difference computation portion 53, a direction determination portion 54 and an ID extraction portion 55. The object detection section 14A is essentially composed of an image coordinate determination portion 56 and an image segmentation portion 142. The two microphones 51a and 51b are placed at positions different in the horizontal direction from each other.

The distance determination portion 52 computes the distance from the information tag 11 based on the intensity of ultrasonic waves received by the microphones 51a and 51b. The time difference computation portion 53 computes the difference in detection time between ultrasonic signals received by the microphones 51a and 51b. The direction determination portion 54 computes the direction of the information tag 11 with respect to the camera 50 (direction in the horizontal plane including the microphones 51a and 51b) based on the detection time difference computed by the time difference computation portion 53. Assume that the direction determination portion 54 holds the correspondence between the detection time difference and the direction.

The image coordinate determination portion 56 determines the position of the information tag 11 in the horizontal direction in an image based on the direction of the information tag 11 obtained by the direction determination portion 54 and the lens focal distance (degree of zooming) at the imaging section 13 sent from a camera control section 57. This processing is substantially the same as the processing of associating the position information of an information tag with position coordinates in an image, described in Embodiment 1.

The ID extraction portion 55 extracts ID information from the ultrasonic signals received by the microphones 51a and 51b. The attribute lookup section 15 reads the height of the person Pd as the detection object from the attribute storage section 16 using the ID information. A template generation part 143 of the image segmentation portion 142 generates a shape template reflecting the size of the person Pd in an image based on the distance obtained by the distance determination portion 52, the height of the person Pd obtained by the attribute lookup section 15 and the lens focal distance sent from the camera control section 57. A template matching part 144 performs matching using the template generated by the template generation part 143 in an area of an image at and around the position of the information tag 11, to detect the position of the person Pd. The position information of the person Pd detected is given to the camera control section 57. Using the position information, the camera control section 57 controls the imaging section 13 to perform more accurate focus adjustment, exposure adjustment, color correction, zoom adjustment and the like.

Figure 22:
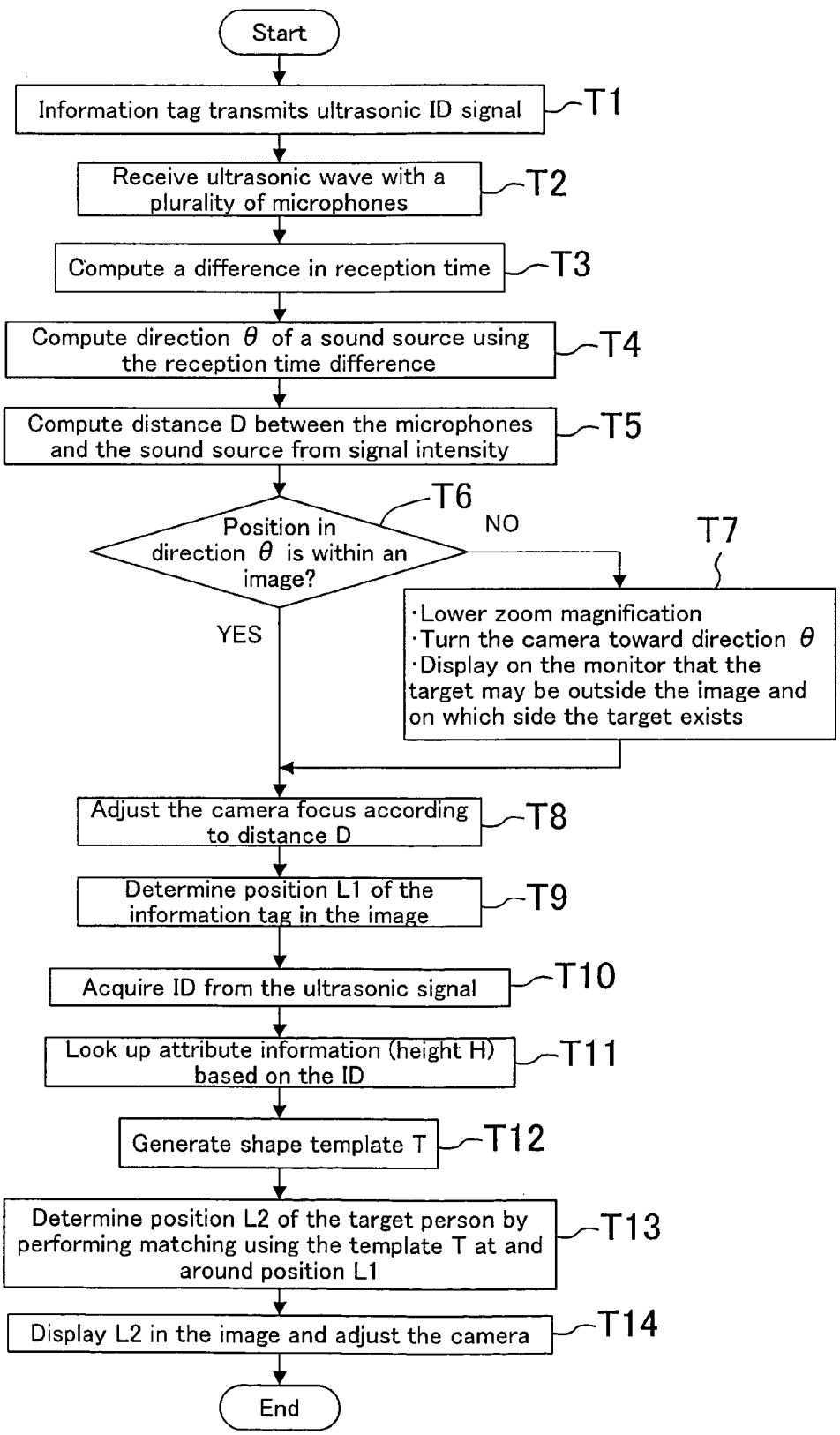
FIG. 22 is a flowchart showing a flow of processing in Embodiment 3 of the present invention.

A flow of the processing in this embodiment will be described with reference to the flowchart of FIG. 22, taking the situation shown in FIG. 20 as an example.

First, the information tag 11 carried by the person Pd as the subject or the detection target transmits ID information via an ultrasonic signal (T1). The microphones 51a and 51b of the camera 50 receives the transmitted ultrasonic signal (T2). A difference in the reception time of the ultrasonic signal between the microphones 51a and 51b is computed (T3), and the direction θ of the information tag 11 with respect to the camera 50 is computed from the reception time difference (T4).

The distance D from the information tag 11 is computed from the intensity of the ultrasonic signal received by the microphones 51a and 51b (T5). At this time, whether or not the position in the direction θ falls within the image taken is determined considering the zoom magnification at the imaging section 13 (T6). If determined that it fails to fall within the image (NO in T6), the zoom magnification is lowered so that the position falls within the image, the orientation of the imaging section 13 is turned toward the direction θ (if the imaging section 13 is mounted on a movable pan head), or a message is displayed on a monitor of the camera 50 notifying the user that the detection target is outside the coverage or on which side of the image the detection target exists, for example, to urge the user to turn the orientation of the camera 50 (T7). In this relation, recording may be automatically halted as long as it is determined that the target is outside the coverage, and may be automatically started once the target falls within the coverage.

Figure 23:
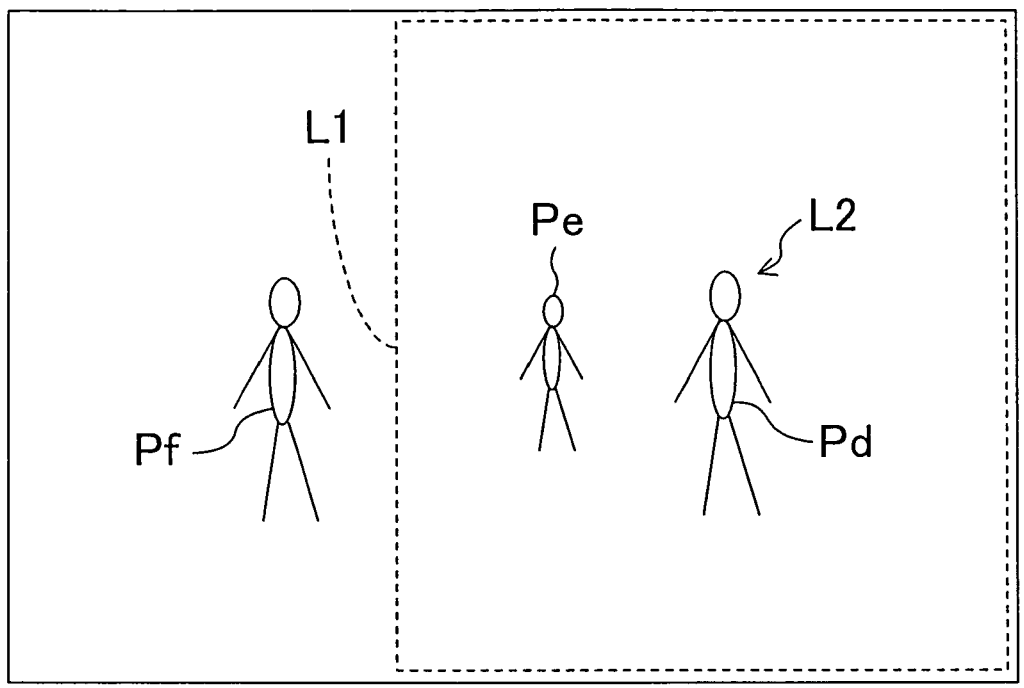
FIG. 23 shows an example of an image obtained during the processing in FIG. 22.

If it is determined that the position in the direction θ falls within the image (YES in T6), the focus adjustment of the camera is performed according to the distance D (T8). Assume that an image as shown in FIG. 23 is obtained by this adjustment. The position (area) L1 of the information tag 11 in the image is then determined based on the zoom magnification and the direction θ (T9). Note however that when the direction is computed with an ultrasonic signal, an error may occur due to influence of the temperature, wind, reflection from a surrounding object, noise and the like. Therefore, it is difficult to limit the area so narrowly as to be able to specify a single person. In the example shown in FIG. 23, not only the person Pd to be detected but also a person Pe is included in the area L1.

Figure 24:
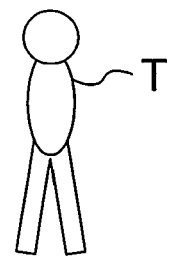
FIG. 24 is an example of a human-shaped template used during the processing in FIG. 22.

ID information is extracted from the ultrasonic signal (T10), and using the ID information, the height H of the target is acquired (T11). A shape template T corresponding to the size of the target supposed to be given on the image is generated based on the height H, the distance D and the zoom magnification (T12). FIG. 24 shows an example of the template T generated in this way. With the template T as shown in FIG. 24, matching is performed for an area of the position L1 and its surroundings in the image. The position giving the highest degree of matching is determined as an accurate position L2 (T13). In this matching, only the person Pd is detected because the person Pe is different in the size on the image from the person Pd. The position L2 is displayed on the image, to allow the user to easily adjust the orientation of the camera and the like as required. Also, adjustment of the aperture and exposure, color correction, focus adjustment and the like of the imaging section 13 are performed according to the color, brightness and quality of the area of the position L2 and its surroundings (T14). In this way, even a user unfamiliar to photographing can take images of the person Pd as the subject accurately.

The step T5 may be executed at any time after the step T2 before the distance D is used. The step T10 may be executed at any time from the step T2 before the step T11.

As described above, in this embodiment, persons similar in the size on an image to each other (persons Pd and Pf) and persons close in position to each other (persons Pd and Pe) can be distinguished from each other correctly. Accordingly, even in a situation including a number of persons, the position of the target can be accurately detected without largely increasing the processing amount. In addition, by using an ultrasonic transmitter as the information tag, the direction and distance can be advantageously computed with a simple and inexpensive system.

In the example described above, two microphones were used. The number of microphones is not limited to this, but may be three or more. If three or more microphones are used, it is possible to compute the direction of the information tag using a plurality of combinations of any two microphones and average the computation results, to thereby improve the precision of the direction computation.

The camera may trigger the information tag to transmit ultrasonic wave by use of ultrasonic wave, radio wave, light or the like. In this case, the time taken from the triggering until reception of an ultrasonic signal may be measured, to compute the distance from the information tag based on the measured time and the sonic speed.

The detection processing described above may be performed only when specific ID information is obtained. This enables detection of only a target having a specific information tag in a situation of existence of a plurality of information tags.

Both the information from the information tag and the image processing may not necessarily be used at all times. For example, if a signal from the information tag is temporarily unreceivable due to influence of noise and the like, the reception state is determined bad, and the processing may be automatically switched to only detection processing with images. In this case, a template used immediately before the switching may be used. On the contrary, If the detection with a template in an image temporarily fails due to influence of a change of sunlight and the like, failure of this detection is determined, and the processing may be automatically switched to detection with only the information on the direction and distance of the information tag. In this way, if one of the two types of information is unusable, the processing is automatically switched to use of only the other type of information. This may lower the detection precision but prevents complete loss of sight of the target, and thus object detection equipment durable against a change in situation can be attained.

Figure 25:
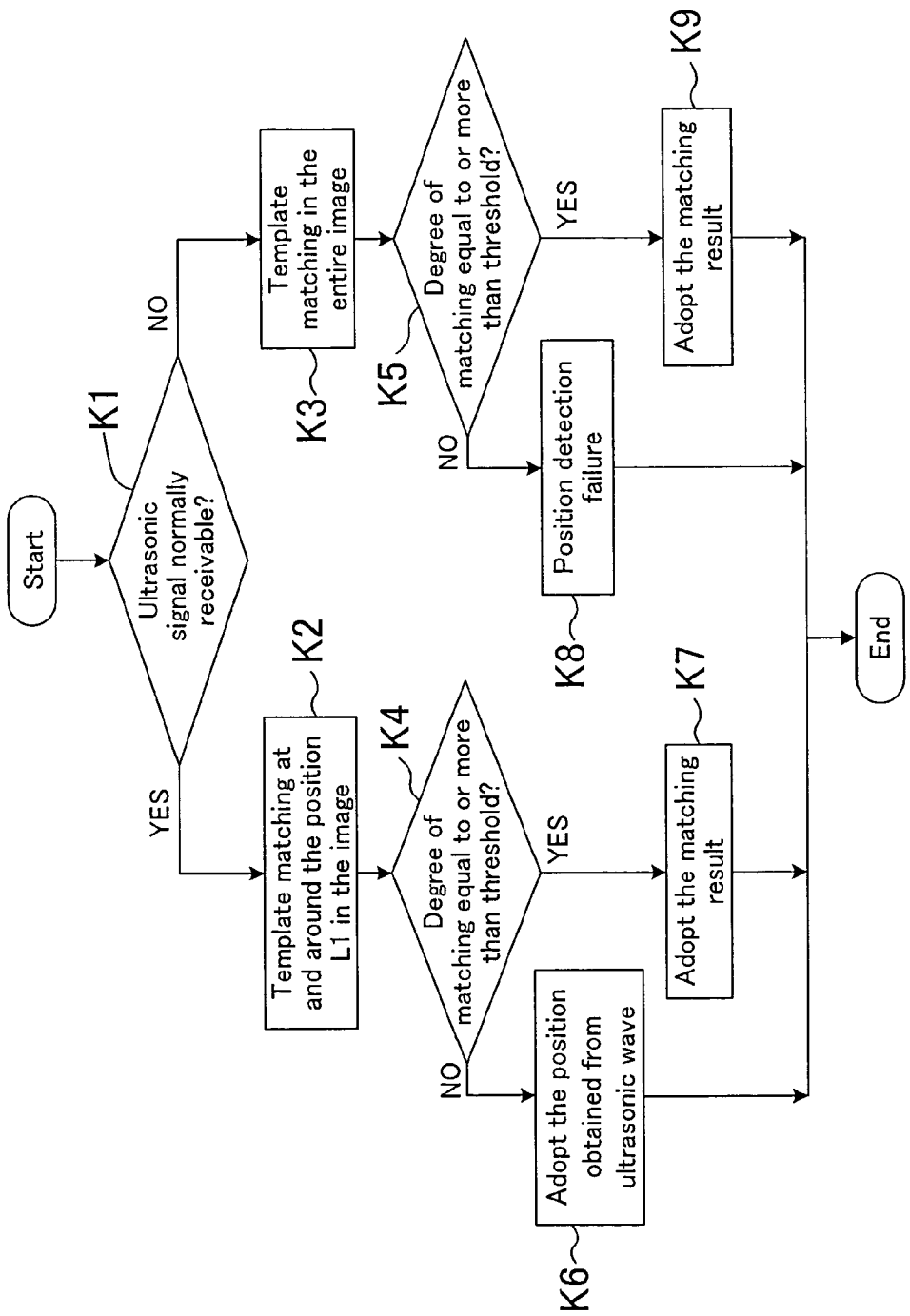
FIG. 25 is a flowchart showing an example of procedure of switching of the detection processing.

FIG. 25 is a flowchart of a procedure of switching of the processing. Referring to FIG. 25, first, whether or not an ultrasonic signal has been normally received by the microphones is determined (K1). If normally received (YES in K1), template matching is performed in an area of an image at and around an estimated position of the information tag determined in the processing described above (K2). Whether or not the maximum of the degree of matching is equal to or more than a predetermined threshold is determined (K4). If it is equal to or more than the threshold (YES), the position giving the maximum degree of matching is determined as the detected position of the person (K7). If it is less than the threshold (NO in K4), the position estimated from the ultrasonic signal is adopted as the detected position of the person (K6). Since this detection is low in reliability, a message notifying that the detection precision is low or that detection with an image is difficult may be displayed on the monitor.

If normal reception of an ultrasonic signal fails in the step K1 (NO in K1), template matching is performed for the entire image (K3). Alternatively, template matching may be performed in an area at and around the detected position at the preceding frame. Whether or not the maximum of the degree of matching is equal to or more than a predetermined threshold is determined (K5). If it is equal to or more than the threshold (YES), the position giving the maximum degree of matching is determined as the detected position of the person (K9). In this case, also, since the detection is low in reliability, a message notifying that the detection precision is low or that detection with ultrasonic wave is difficult may be displayed on the monitor. If it is less than the threshold (NO in K5), failure of position detection is determined. This is displayed on the monitor, or the detection position determined at the preceding frame is adopted (K8).

In the example described above, the detection procedure is switched when one of the information types is unusable. The following techniques may also be adopted to change the detection procedure.

When there exist a plurality of types of ID information obtained from information tags, for example, the range of an image within which the matching is performed may be made wider compared with the case that a single type of ID information is obtained. By this setting, occurrence of miss detection can be suppressed even in the case that interference of ultrasonic signals occurs due to existence of a plurality of transmitting sources and this degrades the precision of position detection with an ultrasonic signal.

When there exist a plurality of positions giving high degrees of matching, the setting may be changed to determine the position of a person obtained from an information tag as the detected position. This can suppress occurrence of erroneously detecting a wrong person when very similar persons exist close to each other and causing frequent displacement of the detection position.

Part or the entire of the processing performed by the object detection equipment of the present invention may be performed by exclusive equipment, or may be implemented as a processing program executed by a CPU incorporated in a computer. Alternatively, as in the monitoring center 31 shown in FIG. 5, the object detection server may receive an image taken by the imaging section and tag information transmitted from an information tag attached to a given target, and detect the given target in the image.

As described above, according to the present invention, by using an image and tag information transmitted from an information tag attached to a given target in integration, the target can be detected accurately in the image and the posture, motion and the like of the target can be specified, even in a place in which the lighting condition greatly changes, such as outdoors, and in a situation in which a plurality of persons and objects exist. Moreover, the processing amount can be suppressed from increasing, and thus the processing time and cost can be significantly reduced compared with the case of performing only image processing.

The invention claimed is:

1. An object detection equipment comprising:
an imaging section for taking an image;
a tag communication section for receiving tag information transmitted from an information tag attached to a given target; and
a target detection section for detecting the given target in the image taken by the imaging section by acquiring position information of the information tag in the image using the tag information received by the tag communication section and by performing image processing by referring to the acquired position information.

2. The object detection equipment of claim 1, wherein the tag information includes attribute information representing an attribute of the given target, and
the target detection section performs the detection using the attribute information included in the tag information received by the tag communication section.

3. The object detection equipment of claim 1, wherein the tag information includes ID information of the given target, the object detection equipment further comprises:
an attribute storage section for storing a correspondence between ID information and attribute information; and
an attribute lookup section for looking up contents of the attribute storage section using the ID information included in the tag information received by the tag communication to obtain the attribute information of the given target. and
the target detection section performs the detection using the attribute information obtained by the attribute lookup section.

4. The object detection equipment of claim 1, wherein the target detection section comprises:
an image segmentation portion for determining a partial image area having the possibility of including the given target in the image by acquiring position information of the information tag in the image using the tag information and by referring to the acquired position information; and
an image recognition portion for detecting the given target in the partial image area determined by the image segmentation portion.

5. The object detection equipment of claim 1, wherein the tag information includes position information representing a position of the information tag, and the target detection section performs the detection by referring to the position information included in the tag information received by the tag communication section.

6. The object detection equipment of claim 1, wherein the tag communication section estimates a position of the information tag from a state of reception of the tag information, and the target detection section performs the detection by referring to the position estimated by the tag communication section.

7. The object detection equipment of claim 1, wherein the tag information includes a detection procedure for the given target, and
the target detection section performs the detection by executing the detection procedure included in the tag information received by the tag communication section.

8. The object detection equipment of claim 1, wherein the target detection section performs the detection with only image processing without use of the tag information when a reception state of the tag communication section is bad.

9. An object detection server for receiving an image taken by an imaging section and tag information transmitted from an information tag attached to a given target, and
detecting the given target in the image by acquiring position information of the information tag in the image using the tag information and by performing image processing by referring to the acquired position information.

10. An object detection method comprising the steps of:
receiving an image taken by an imaging section;
receiving tag information transmitted from an information tag attached to a given target; and
detecting the given target in the image by acquiring position information of the information tag in the image using the tag information and by performing image processing by referring to the acquired position information.

11. The object detection server of claim 9, wherein in detecting the given target,
a partial image area having the possibility of including the given target is determined in the image by acquiring position information of the information tag in the image using the tag information and by referring to the acquired position information; and the given target is detected in the determined partial image area.

12. The object detection method of claim 10, wherein the detecting step comprises:

an image segmentation step of determining a partial image area having the possibility of including the given target in the image by acquiring position information of the information tag in the image using the tag information and by referring to the acquired position information; and an image recognition step of detecting the given target in the partial image area determined in the image segmentation step.

13. The object detection equipment of claim 1, wherein the target detection section links in advance position coordinates in a three-dimensional space in which the given target exists with coordinates in the image and refers to the linking to acquire position information of the information tag in the image using the tag information.

* * * * *